(12) United States Patent
Laventure

(10) Patent No.: US 7,918,554 B2
(45) Date of Patent: Apr. 5, 2011

(54) SPECTACLE AND WRITING INSTRUMENT COMBINATION

(76) Inventor: Yannick Laventure, Perth (AU)

(*) Notice: Subject to any disclaimer, the term of this patent is extended or adjusted under 35 U.S.C. 154(b) by 0 days.

(21) Appl. No.: 12/385,338

(22) Filed: Apr. 6, 2009

(65) Prior Publication Data

US 2009/0273755 A1    Nov. 5, 2009

Related U.S. Application Data

(60) Provisional application No. 61/126,353, filed on May 2, 2008.

(51) Int. Cl.
*G02C 1/00* (2006.01)

(52) U.S. Cl. ......................... 351/158; 351/111

(58) Field of Classification Search .................. 351/41, 351/42, 111, 112, 158
See application file for complete search history.

(56) References Cited

U.S. PATENT DOCUMENTS

| | | | |
|---|---|---|---|
| 1,787,830 A | 1/1931 | Lloyd | |
| 2,850,152 A | 9/1958 | Marrufo | |
| 3,647,059 A | 3/1972 | Humphreys | |
| 3,769,663 A | 11/1973 | Perl | |
| 4,852,221 A | 8/1989 | Antonucci | |
| 5,430,503 A | 7/1995 | Colitz | |
| 5,929,967 A | 7/1999 | Conner | |
| 5,949,515 A | 9/1999 | Hoshino | |
| 7,018,037 B1* | 3/2006 | Jouver, III | ............ 351/121 |
| 2007/0013864 A1 | 1/2007 | Dietz | |

* cited by examiner

*Primary Examiner* — Huy K Mai
(74) *Attorney, Agent, or Firm* — Parsons & Goltry; Robert A. Parsons; Michael W. Goltry

(57) ABSTRACT

A pair of spectacles is provided which includes a writing instrument, a spectacle frame front, a first spectacle temple having an end coupled to the spectacle frame front and a second spectacle temple having an end coupled to the spectacle frame front. The first spectacle temple includes a hollow recess formed in an outer surface thereof, the writing instrument removably received and retained therein.

2 Claims, 11 Drawing Sheets

SPECTACLE AND WRITING INSTRUMENT COMBINATION

I claim priority to my Provisional Application, Provisional Application No. 61/126,353 filed on the 2 May, 2008.

BACKGROUND

This invention relates to spectacles, writing instruments and their combined use, allowing a wearer the freedom to wear spectacles without interruption whilst having convenient direct access to an attached writing instrument. Spectacle wearers often need to be wearing their spectacles in order to see what they are writing.

In the Optical field, many eye conditions result in the need for spectacles. Some of these conditions include myopia, hyperopia, astigmatism and presbyopia. Safety spectacles and sunglasses are also examples of a need for spectacles, used for eye protection applications.

Presbyopia (the need for reading spectacles) is an inevitable eye condition affecting the lens within the eye. To be able to read, write or see up close, the lens flexes. This flexing action is known as accommodation. With age the lens loses its flexibility. Therefore simple close-up tasks like reading and writing become more difficult. This results in a certain need for spectacles.

Looking closely at the above definition of presbyopia, as an example, one can see the close correlation between the need for spectacles and the use of a writing instrument. Writing instruments may include but should not be restricted to pens, pencils, styluses and specialty trade writing instruments. Unfortunately, writing instruments are often misplaced. Therefore a spectacle and writing instrument combination which uses an integrated holding apparatus for the attachment of a writing instrument provides great advantages. One major advantage being the wearer has the freedom of uninterrupted use of the spectacles whilst having the option to directly access the attached writing instrument at all times.

U.S. Pat. No. 5,929,967 to Conner (1999) offers a solution to the pen and spectacles combination however it is very limiting in a number of ways. As Conner himself stated in the opening abstract, it is a case for glasses having a hollow barrel portion suitable for a "small pair of glasses" only. If the spectacle frame is larger than the narrow case, it would not be able to contain the spectacle frame. In today's changing spectacle fashion world, spectacle frames come in many sizes and shapes. Conner's narrow spectacle case is too limiting and only caters for spectacles of one size.

Conner does not present a practical solution to the pen and spectacles combination. The wearer must physically open the barrel from the rear to have access to the small spectacles inside and once the spectacles are in place on the wearer, the case is then used for writing. After use, the wearer must stop, remove the small spectacle frame from the worn position, fold down the temples and return it to its case in order to keep the two items together.

The extra steps involved in accessing and returning the spectacles would be a hindrance to the wearer.

U.S. Pat. No. 4,852,221 to Antonucci (1989) relies on two methods of attaching the writing instrument held within his apparatus.

In the first method, a sports sunglass band (Croakies) must be threaded onto the sunglass temples. A flat bar is attached to the apparatus, which is then tucked under the sports band on one temple in order to hold it in place. The writing instrument is contained within the apparatus. This method is complicated because the whole invention requires too many components. They include the spectacle temple, the apparatus itself, the flat bar extending from the side of the apparatus, the writing instrument and the tight fitting sports sunglass band.

Every time the user wants to attach the apparatus and pen, they must slide the sports band sleeve back onto the spectacle temple, slide the flat bar of the apparatus into the sleeve then reposition it so that it is comfortable enough to be worn on their head. The co-ordination of these steps is very time consuming as well as inconvenient.

The second method of attachment is the use of velcro. The sleeve with the attached velcro is also not practical because it is not integrated as part of the spectacles and can still slide freely along the temple length, making the attachment unstable for the wearer and therefore inconvenient. Each time the pen is removed, significant strain is concentrated at the area of attachment. Not only would the stability of this attachment be inadequate because the clip apparatus is not permanently fastened, but it would also be susceptible to unwanted separation and loss of the components.

Once again there are too many parts involved complicating the process including the spectacle frame, the clip, the writing instrument, the sunglass sports band and the velcro.

The flashlight attachment clip for spectacles, U.S. Pat. No. 3,769,663, to Perl (1973) is not relevant because it relates to the attachment of flashlights rather than writing instruments. The nature of Perl's "two part clip" is also unnecessarily elaborate. The clip is made up of one detachable part placed onto the spectacle temple and another part containing the flash light. The two are joined using a slot for the pivot stud at one end and a clamp on the other end. It also is adjustable vertically, pivoting on a stud so the wearer can move the flashlight up or down depending on the light position requirements. This is not relevant to spectacle and writing instrument combinations. It pertains to the adjustability of light beam positioning which is in no way relevant to writing instruments.

In modern day optics, Perl's temple-engaging clip would be unstable and prove to function poorly because spectacle temples vary greatly in size, thickness and shape. The likelihood of a perfect fit for every pair of spectacles is remote because of the vast range of temple dimensions. Perl has limited his attachment clip to two sizes only. If the spectacle temple is thicker, the wearer must physically bend up or break off the more narrowly spaced inner clip. Not only does this leave a rough and unsightly edge to the clip (as shown in his diagram, FIG. 3. Reference Numeral 25), it is also an extra effort for the wearer prior to being able to use the device.

Inserting and removing the flashlight, is likely to be a problem because Perl's two part clip is not securely fixed as part of the complete spectacles. A detachable clip may work loose from the spectacle temple and lack stability when worn. The whole clip could even slide and come adrift.

U.S. Pat. No. 5,430,503 to Colitz (1995) combines a pair of spectacles with a pen. The pen is unfortunately too far locked in, within one of the spectacle temples, and uses the locking mechanism to secure the temple in place.

The major obvious disadvantage is the wearer does not have continuous use of the spectacles. Spectacle wearers generally need to be wearing their spectacles to be able to see what they are writing. The wearer of Colitz's invention must physically remove and dismantle their spectacle frame in order to unlock the pen for use. Whilst the pen is in use, the wearer cannot wear the spectacle frame because of the dismantling process. Once the pen is dismantled for use, the spectacle frame is in effect missing one of its temples. Without a pair of temples, spectacles are not complete and cannot be worn. With one absent temple, there is no support on one side of the spectacles. This automatically disqualifies the use of the spectacles as it is now missing a supporting temple. Conversely, if the spectacles are used correctly with two supporting temples, the use of the pen is disqualified.

The absence of the temple on a pair of safety spectacles for example, would not qualify that pair of spectacles for safety standard requirements. This is because the frame is no longer secure when worn.

The diameter and shape of Colitz's pen needs to be considered a disadvantage. People with larger hands, men in particular, would find such a thin pen as illustrated in Colitz's FIG. 2 uncomfortable to use. Also the temples in Colitz's drawings are curved to fit behind the wearer's ear. Such a curve would not be comfortable or practical when writing.

U.S. Pat. No. 1,787,830 to Marvin (1931) is not practical for a number of reasons. To begin with, the wearer would have to wear the pen or pencil in a vertical position, pressed hard up against the side of the wearer's face. This vertical holding position would not be comfortable or safe for the wearer. Also, gravity working on a vertically placed pen or pencil within the leaf spring would tend to have a downward pulling effect on the pen or pencil, adding to the risk of it eventually dropping out of the attachment.

Aesthetically the vertical attachment of the pen or pencil is out of place as it is carried and displayed in a most cumbersome way. The vertical placement of the pen or pencil may also interfere with the varying facial contours of each respective wearer.

U.S. Pat. No. 3,647,059 to Humphreys (1972) shows a hollow cylindrical accessory receptacle mounted on a temple. The apparatus is used for dispensing small pieces of tissue used for cleaning spectacle lenses. This device, however is not relevant to the combination of writing instruments and spectacles because it does not include the use of a writing instrument.

U.S. Pat. No. 5,949,515 given to Hoshino (1999) is simply an additional spectacle frame "which can be put on together with other ordinary spectacles to correct among others, age related farsightedness". However it remains irrelevant because it does not include the use of a writing instrument.

Marrufo (1958) U.S. Pat. No. 2,850,152 has tried to combine three items together using a case. It is simply a flexible pouch-type case offering the user three compartments to organise three objects separately which can be worn on the belt or in a pocket. These objects may include spectacles, pens, combs and the like. Marrufo's invention is not relevant as it does not combine, by attachment, a writing instrument and a pair of spectacles.

In conclusion, no writing instrument and spectacle combination formerly developed provides the practical simplicity of a pair of spectacles with an integrated holding apparatus for directly attaching writing instruments to the spectacles. These prior art examples demonstrate defects by using unnecessary multiple components, impractical choice of positioning, and more importantly these earlier patents show an interruption in the continuous wear of the spectacles in order to access the writing instrument.

SUMMARY

The invention is a new and improved writing instrument and spectacle combination. The writing instrument is attached to the spectacle frame using an integrated holding apparatus. The holding apparatus can be mounted and fixed onto one of the surfaces of the spectacles, for example the surface of the spectacle temple. Alternately, the holding apparatus can take on the form of a magnetic connection between the writing instrument and the spectacles. The holding apparatus could also be molded and cast into shape from various materials as part of the spectacles.

The holding apparatus is horizontally aligned along either the right or the left spectacle temple or along the brow section of the frame front. This allows a user to have easy, immediate access to the writing instrument whilst wearing the spectacles uninterrupted.

The writing instrument and spectacle combination provides greater practicality for the wearer. In terms of freedom of use, the wearer is at an advantage because the writing instrument can be instantly detached and ready for use, and easily re-attached. This takes place without interrupting the wearer's use of the spectacles, which is particularly useful as spectacles are used as vision aids as well as for eye protection, including safety spectacles and sunglasses. This provides another great advantage because many of these applications of spectacle wear do not permit the removal of the spectacles.

DRAWINGS

DETAILED DESCRIPTION

Figure 1:
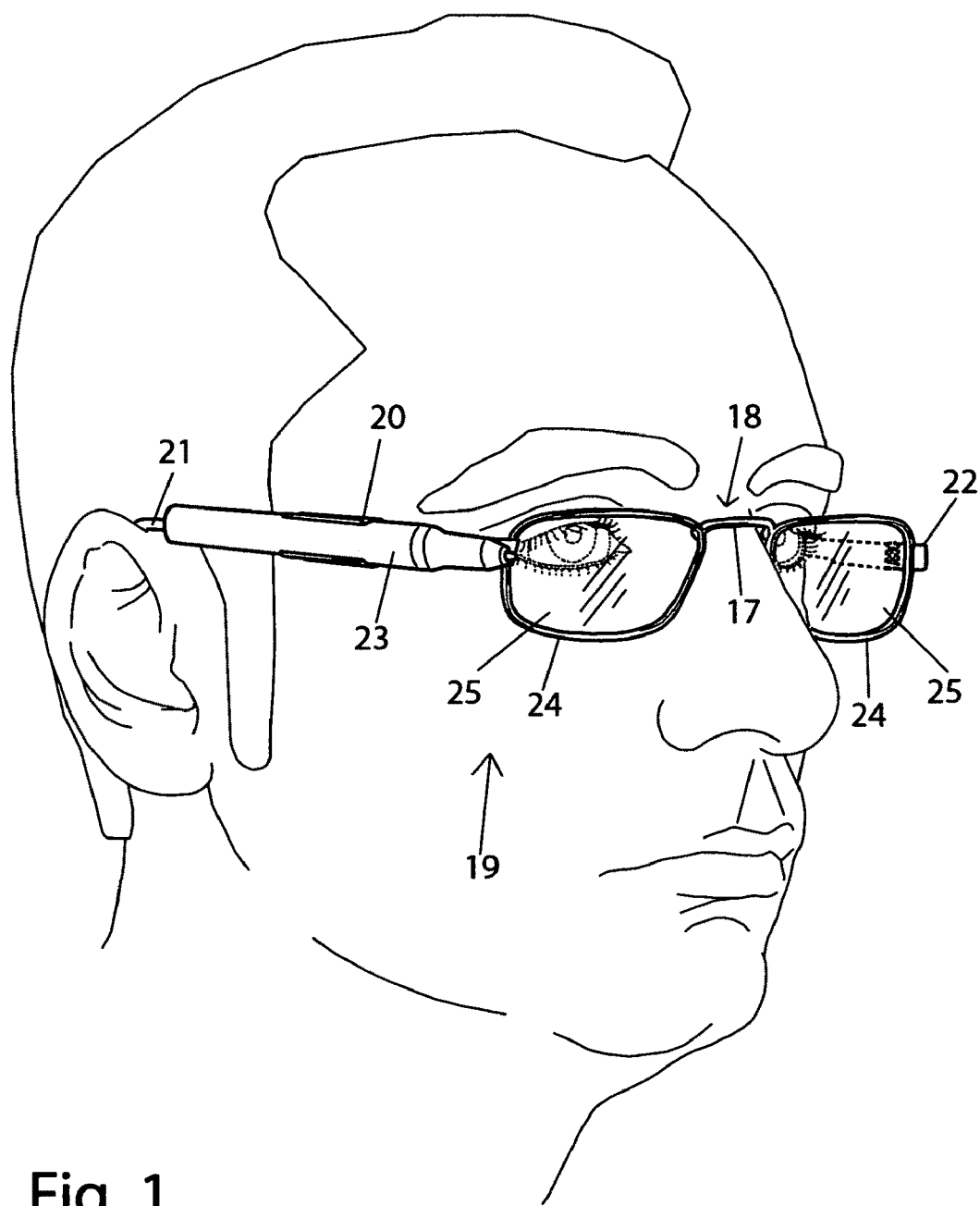
FIG. 1 is a perspective right-side view of the writing instrument and spectacle combination, worn in its normal position. The writing instrument is attached securely within a clip-type holding apparatus.
Figure 10:
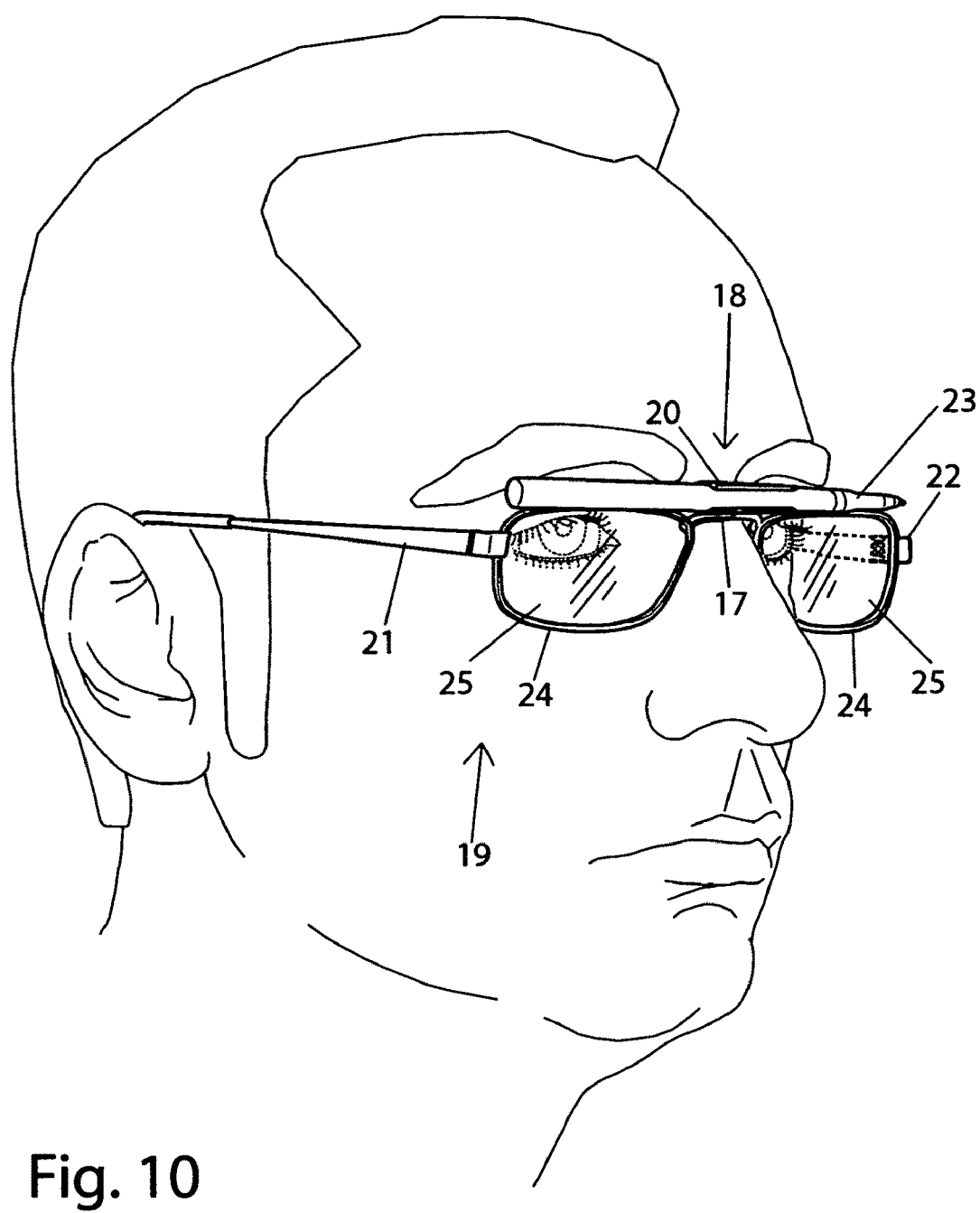
FIG. 10 is a perspective right-side view of the writing instrument and spectacle combination, worn in its normal position. The writing instrument is attached securely within the holding apparatus which is located on the brow section of the spectacle frame front.

FIG. 1 is a perspective right-side view of spectacle frame 19. Spectacle frame 19 includes a holding apparatus 20, a right-side spectacle temple 21, a left-side spectacle temple 22 and spectacle lens rims 24. Spectacle lens rims 24 surround and contain the spectacle lenses 25. Spectacle frame front 18 includes nose bridge 17 and spectacle lens rims 24. Spectacle frame front 18 is attached to right-side spectacle temple 21 and left-side spectacle temple 22. A writing instrument 23 is secured to right-side spectacle temple 21 using holding apparatus 20. Holding apparatus 20 can also be integrated along left-side spectacle temple 22 or the brow section of spectacle frame front 18 (FIG. 10).

Figure 11:
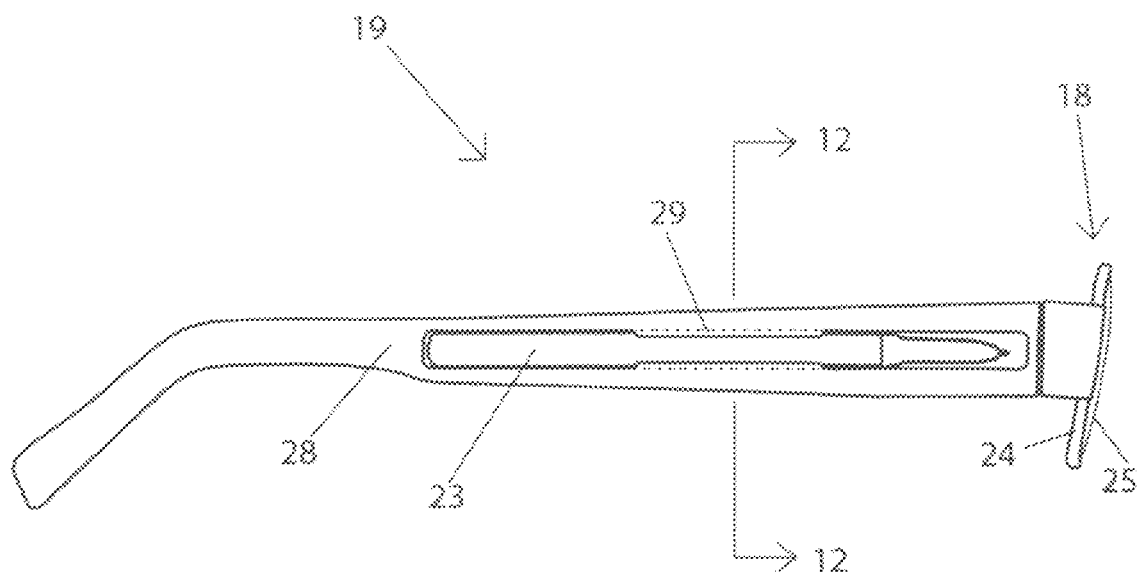
FIG. 11 is a right-side view of the writing instrument and spectacle combination with the writing instrument attached. The holding apparatus is illustrated as a hollow recess integrated as part of the spectacle temple for attaching the writing instrument.

Integrated holding apparatus 20 can take many different forms including a clip-type holder, as illustrated. Integrated holding apparatus 20 can also be in the form of a magnetic connection between spectacle frame 19 and writing instrument 23 (FIG. 9, magnetic connection holding apparatus 27). Integrated holding apparatus 20 can also be in the form of a hollow recess within spectacle frame 19 (FIG. 11, hollow recess holding apparatus 29)

Methods for integrating holding apparatus 20 are many and varied and therefore should not be limited to the following examples. Holding apparatus 20 can be mounted and fixed to spectacle frame 19 using fasteners such as rivets, screws, welds and the like. Holding apparatus 20 can also be molded, cast and shaped as part of spectacle frame 19, depending on materials used.

Therefore holding apparatus 20 can take many forms, as well as being integrated in various locations as part of spectacle frame 19.

Spectacle frame 19 and holding apparatus 20 can be made of various materials including metals, plastics and many others.

Figure 2:
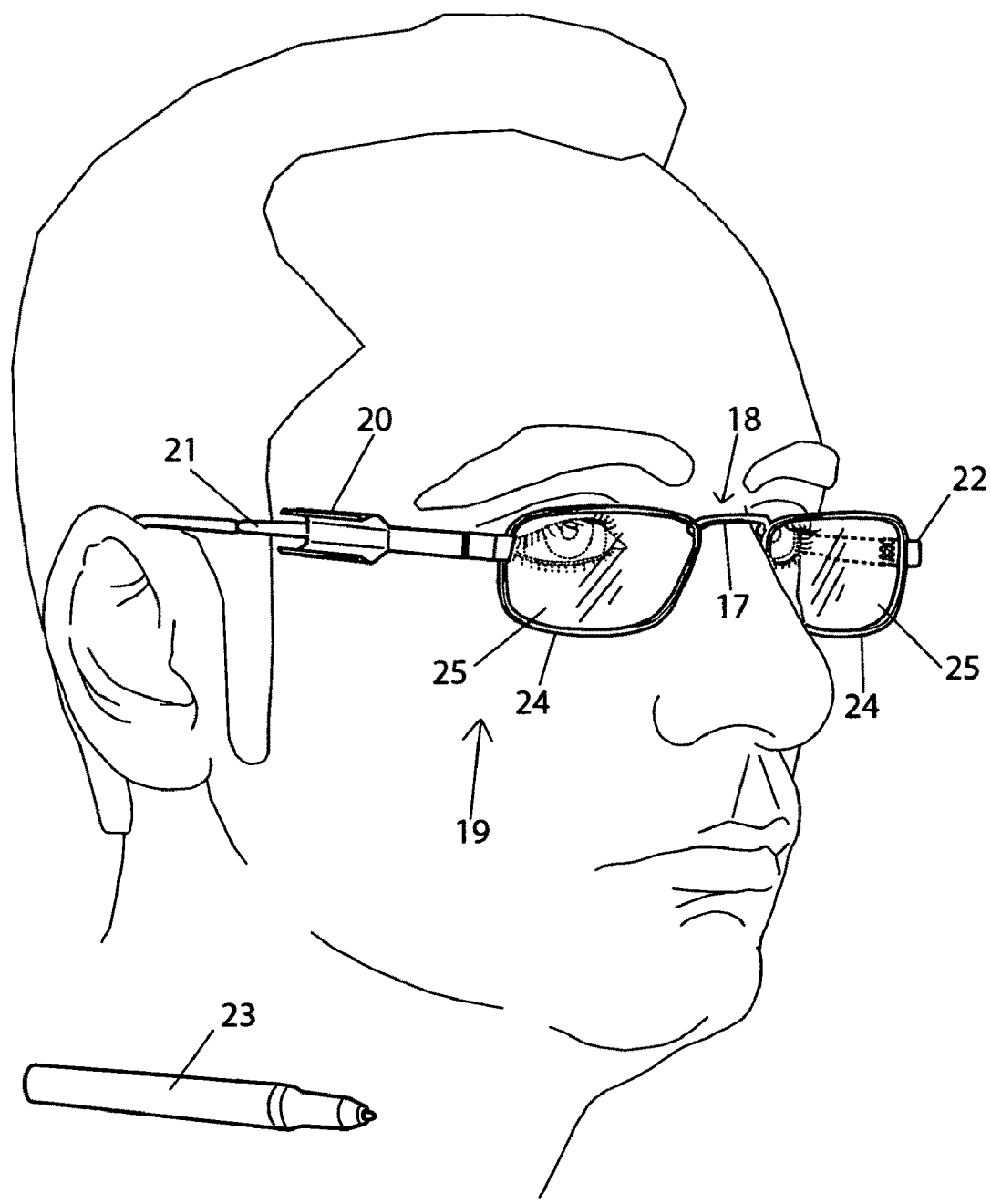
FIG. 2 is a perspective right-side view of the writing instrument and spectacle combination, worn in its normal position. The writing instrument is detached, demonstrating it is in use.

FIG. 2 is a perspective right-side view of spectacle frame 19, with writing instrument 23 now detached from holding apparatus 20 which is along right-side spectacle temple 21. Writing instrument 23 is now free for use. Spectacle frame 19 remains in wearing position for continued and interruption-free viewing through spectacle lenses 25.

Figure 3:
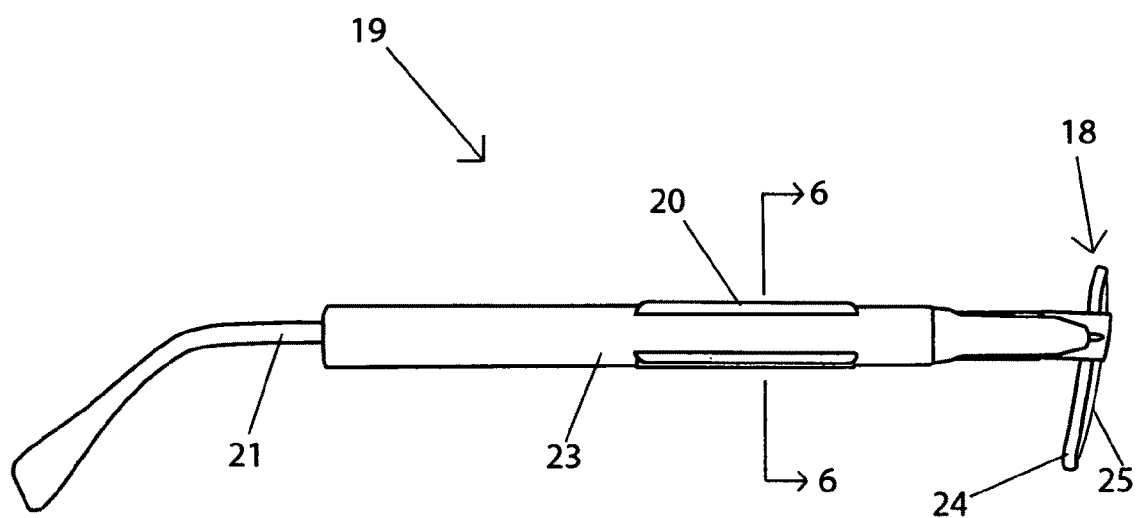
FIG. 3 is a right-side view of the writing instrument and spectacle combination. The writing instrument is attached.

FIG. 3 is a right-side view of spectacle frame 19 with holding apparatus 20 integrated along right-side spectacle temple 21. Holding apparatus 20 attaches writing instrument 23 to right-side spectacle temple 21. Spectacle lens rims 24 surround and contain spectacle lenses 25.

Figure 4:
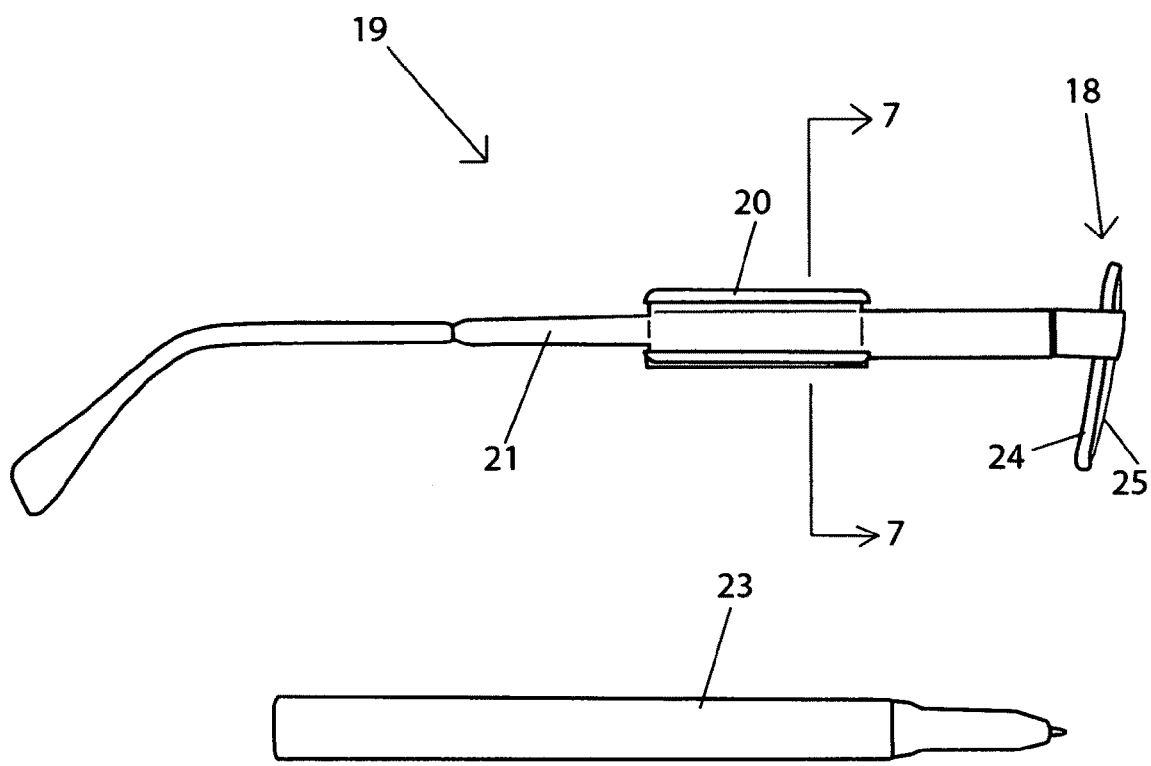
FIG. 4 is a right-side view of the writing instrument and spectacle combination. The writing instrument is detached.

FIG. 4 is a right-side view of spectacle frame 19 with holding apparatus 20 integrated along right-side spectacle temple 21. Writing instrument 23 is detached from holding apparatus 20 and is free for use.

Figure 5:
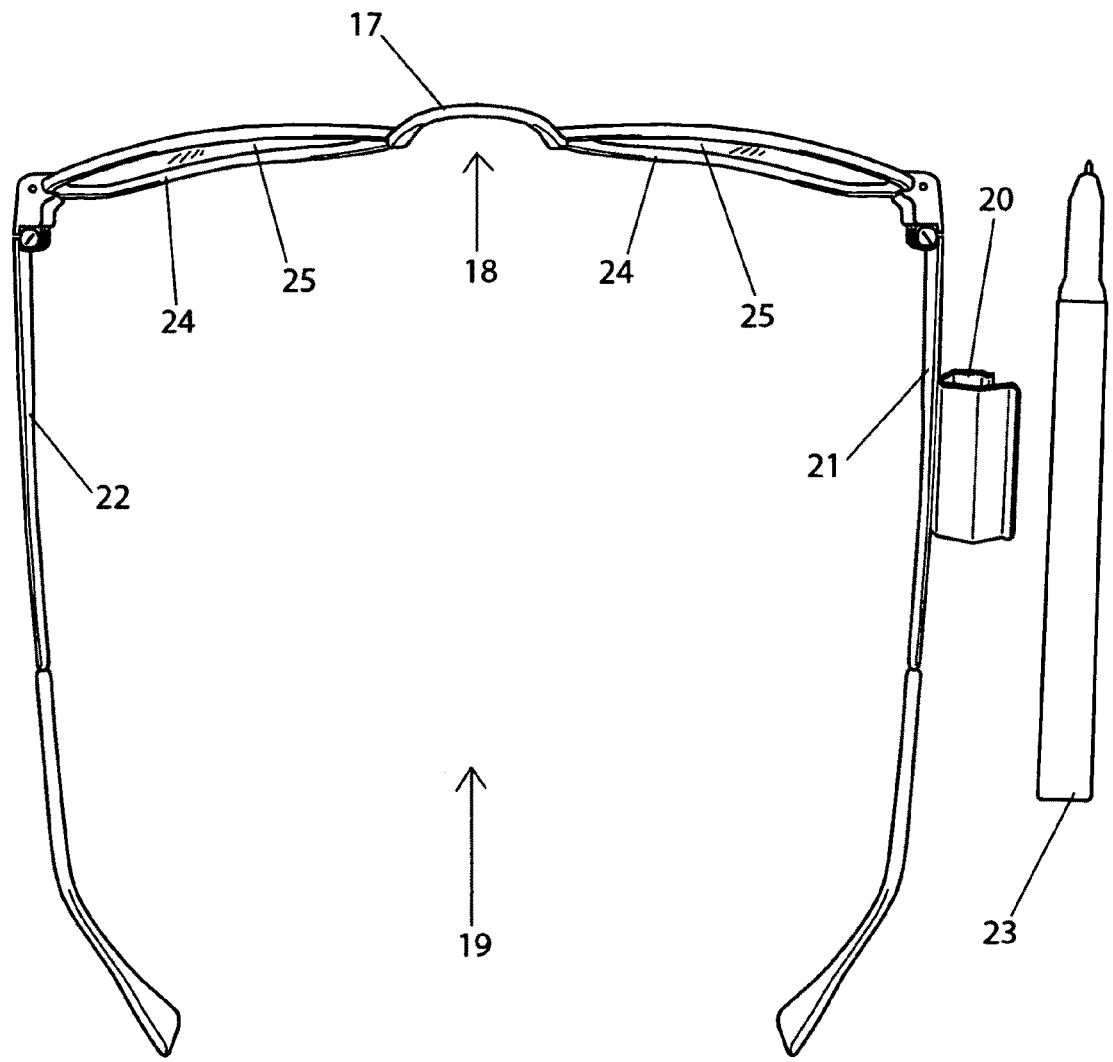
FIG. 5 is a perspective top view of the writing instrument and spectacle combination. The writing instrument is detached.

FIG. 5 is a perspective top view of spectacle frame 19. Holding apparatus 20 is integrated along right-side spectacle temple 21. Holding apparatus 20 is shown empty, with writing instrument 23 detached and ready for use.

Figure 6:
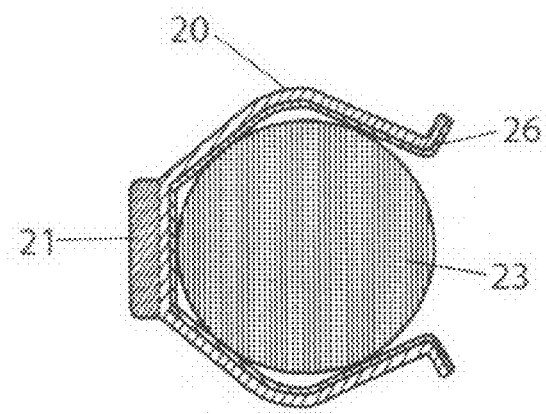
FIG. 6 is a sectional view of the holding apparatus in FIG. 3, taken at the sectioning plane and in the direction indicated by section lines 6-6.

FIG. 6 is a vertical cross section through holding apparatus 20, a protective inner lining of holding apparatus 26, right-side spectacle temple 21 and writing instrument 23, as indicated by section lines 6-6 in FIG. 3. Holding apparatus 20 may or may not have protective inner lining of holding apparatus 26, depending on materials used to produce holding apparatus 20. Protective inner lining 26 prevents writing instrument 23 from scratching, rubbing and discolouration.

Figure 7:
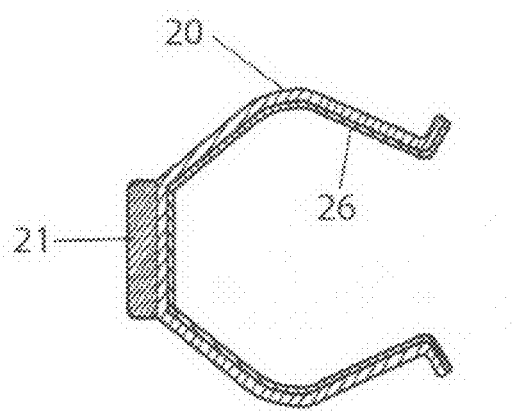
FIG. 7 is a sectional view of the holding apparatus in FIG. 4, taken at the sectioning plane and in the direction indicated by section lines 7-7.

FIG. 7 is a vertical cross section through holding apparatus 20, protective inner lining of holding apparatus 26 and right-side spectacle temple 21, as indicated by section lines 7-7 in FIG. 4. Holding apparatus 20 is displayed in its vacant form, as would be the case when writing instrument 23 is detached and in use. Holding apparatus 20 may or may not have protective inner lining of holding apparatus 26, depending on materials used to produce holding apparatus 20.

Figure 8:
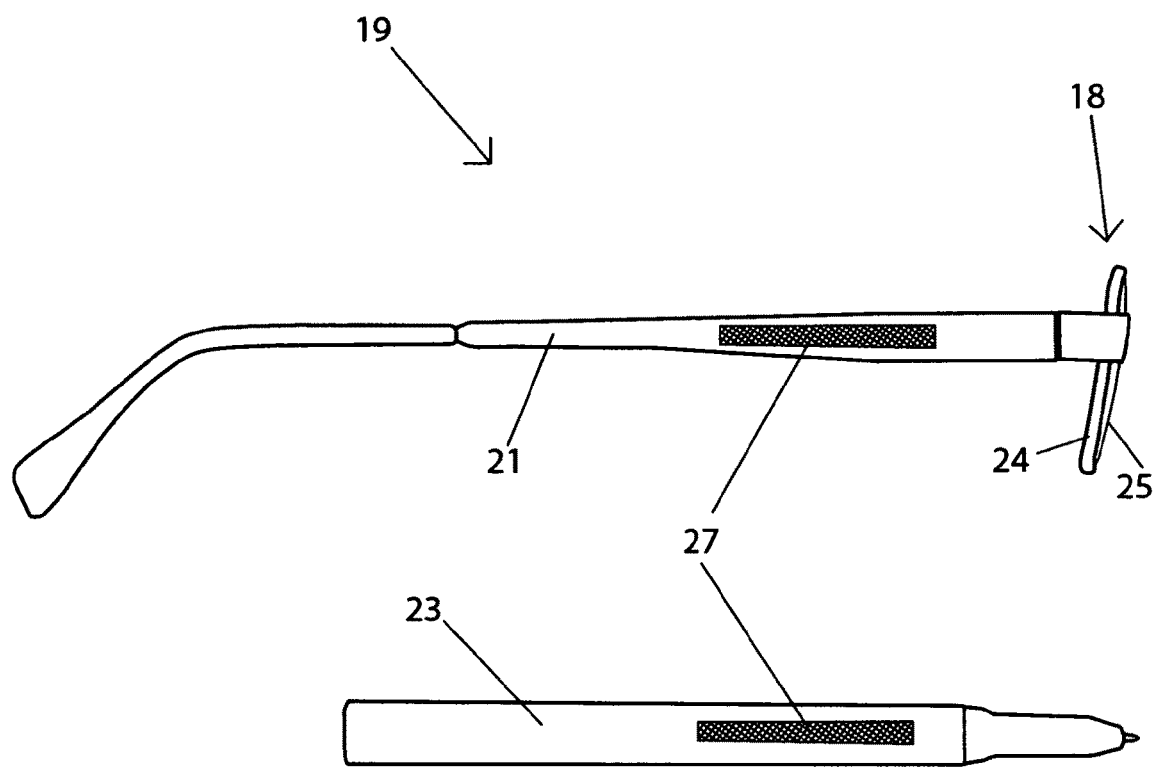
FIG. 8 is a right-side view of the writing instrument and spectacle combination using a magnetic connection as a holding apparatus. The writing instrument is detached.

FIG. 8 is a right-side view of spectacle frame 19 illustrating a magnetic connection holding apparatus 27, integrated along right-side spectacle temple 21. Writing instrument 23 is detached from spectacle frame 19 and is free for use. Magnetic connection holding apparatus 27 can also be integrated along left-side spectacle temple 22 or the brow section of spectacle frame front 18.

Figure 9:
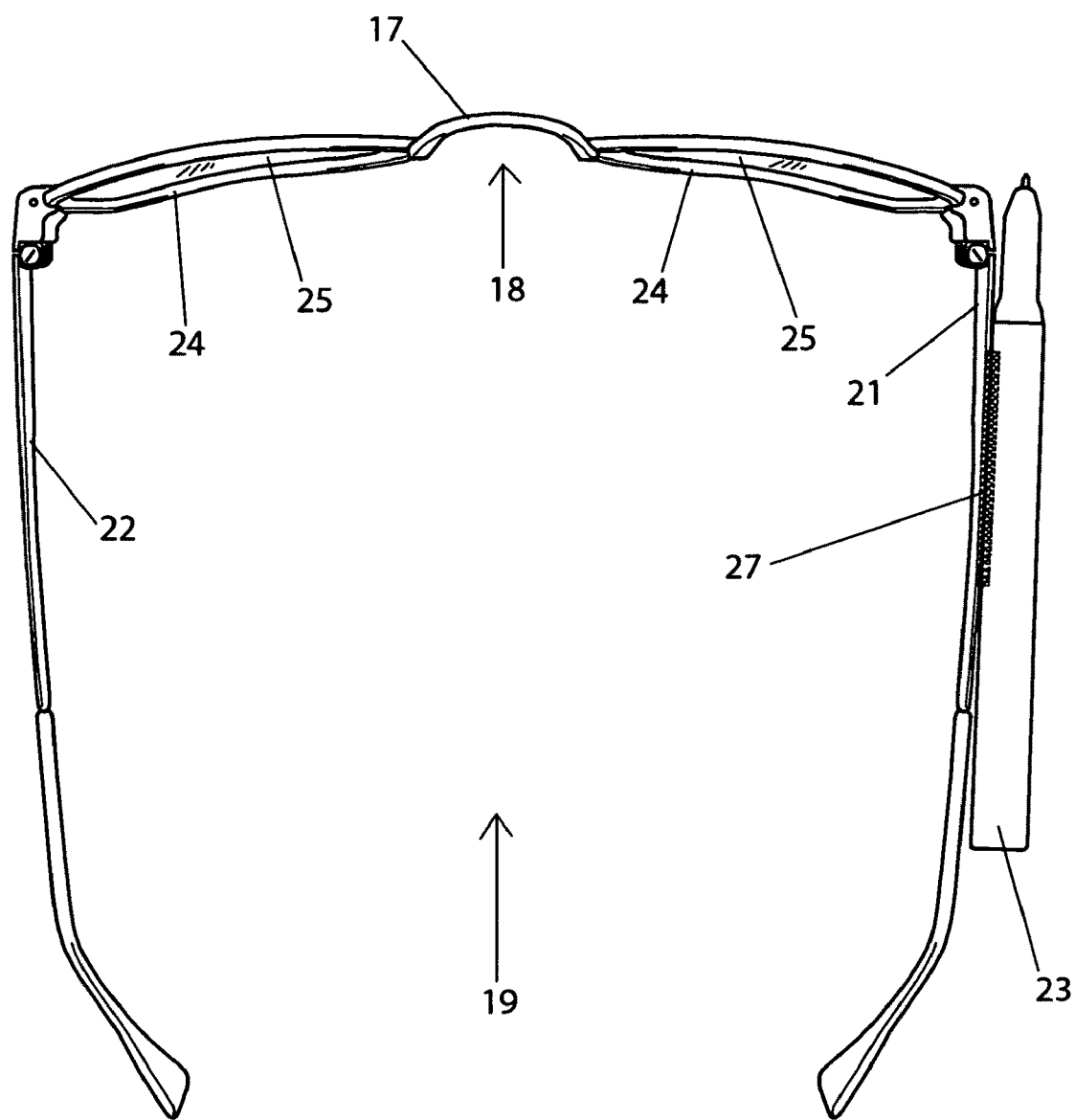
FIG. 9 is a perspective top view of the writing instrument and spectacle combination using a magnetic connection as a holding apparatus. The writing instrument is attached.

FIG. 9 is a perspective top view of spectacle frame 19 illustrating a magnetic connection holding apparatus 27, integrated along right-side spectacle temple 21. Writing instrument 23 is attached to spectacle frame 19 using magnetic connection holding apparatus 27.

FIG. 10 is a perspective right-side view of spectacle frame 19. Spectacle frame 19 has clip-type holding apparatus 20 integrated along the brow section of spectacle frame front 18. Writing instrument 23 is attached to spectacle frame front 18 by holding apparatus 20.

Integrated holding apparatus 20 can take many different forms including a clip-type holder, as illustrated. Integrated holding apparatus 20 can also be in the form of a magnetic connection between spectacle frame 19 and writing instrument 23 (FIG. 9, magnetic connection holding apparatus 27). Integrated holding apparatus 20 can also be in the form of a hollow recess within spectacle frame 19 (FIG. 11, hollow recess holding apparatus 29).

Therefore holding apparatus 20 can take many forms, as well as being integrated in various locations as part of spectacle frame 19.

FIG. 11 is a right-side view of spectacle frame 19 with hollow recess holding apparatus 29 being an integrated hollow recess as part of right-side spectacle temple 28. Hollow recess holding apparatus 29 attaches writing instrument 23 to right-side spectacle temple 28.

Hollow recess holding apparatus 29 can be molded, cast and shaped as part of spectacle frame 19. Hollow recess holding apparatus 29 can also be integrated in various other locations as part of spectacle frame 19.

Figure 12:
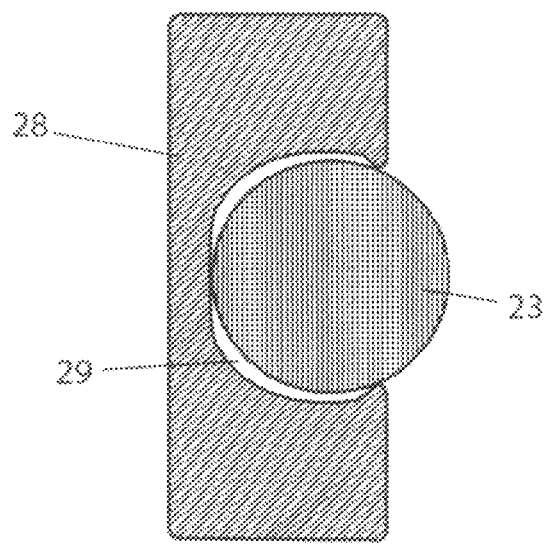
FIG. 12 is a sectional view of the holding apparatus in FIG. 11, taken at the sectioning plane and in the direction indicated by section lines 12-12.

FIG. 12 is a vertical cross section through hollow recess holding apparatus 29, right-side spectacle temple 28 and writing instrument 23, as indicated by section lines 12-12 in FIG. 11. Writing instrument 23 is secured within hollow recess holding apparatus 29.

Figure 13:
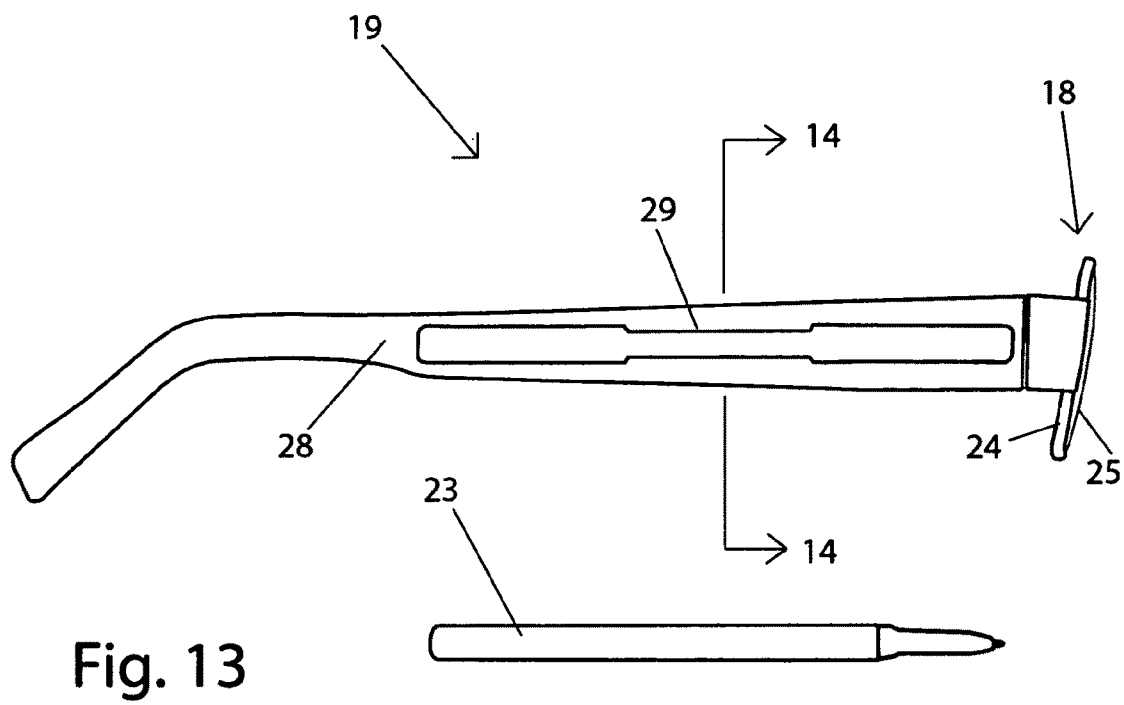
FIG. 13 is a right-side view of the writing instrument and spectacle combination with the writing instrument detached. The holding apparatus is illustrated as a hollow recess integrated as part of the spectacle temple.

FIG. 13 is a right-side view of spectacle frame 19 with hollow recess holding apparatus 29 being an integrated hollow recess as part of right-side spectacle temple 28. Writing instrument 23 is detached from hollow recess holding apparatus 29.

Figure 14:
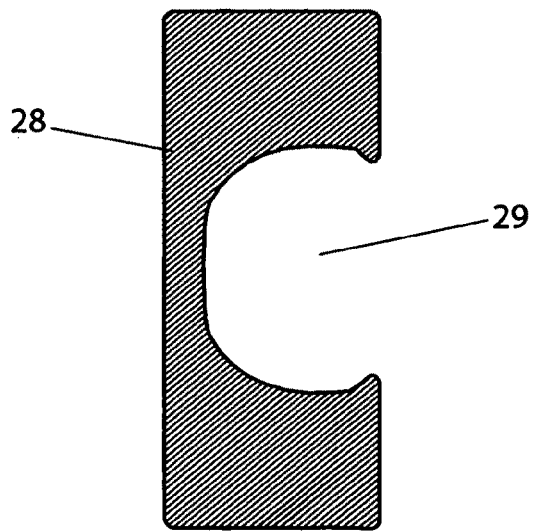
FIG. 14 is a sectional view of the holding apparatus in FIG. 13, taken at the sectioning plane and in the direction indicated by section lines 14-14.

FIG. 14 is a vertical cross section through hollow recess holding apparatus 29 and right-side spectacle temple 28, as indicated by section lines 14-14 in FIG. 13. Hollow recess holding apparatus 29 is illustrated in its vacant form as though writing instrument 23 were detached.

REFERENCE NUMERALS

17 Nose bridge
18 Spectacle frame front
19 Spectacle frame
20 Holding apparatus

21 Right-side spectacle temple
22 Left-side spectacle temple
23 Writing instrument
24 Spectacle lens rim
25 Spectacle lens
26 Protective inner lining of holding apparatus
27 Magnetic connection holding apparatus
28 Right-side spectacle temple
29 Hollow recess holding apparatus
Operation During operation, the Spectacle and Writing Instrument Combination is used as a vision aid or for eye protection, the same way one would wear spectacles in normal, everyday use, including safety glasses and sunglasses.

The wearer opens out the right-side spectacle temple 21 and left-side spectacle temple 22, and positions spectacle frame 19 in the normal spectacle wearing position (FIG. 1). Integrated holding apparatus 20 directly attaches writing instrument 23 to spectacle frame 19. By integrating the holding apparatus 20, the spectacle and writing instrument combination becomes one whole appliance, creating greater stability and ease of use.

The simple steps required for use begin when the wearer, in need of the writing instrument 23, reaches for the attached writing instrument 23 held securely in place by the holding apparatus 20, 27 or 29.

In the case of FIG. 1, detachment occurs when the wearer gently pulls the writing instrument 23 away from the right-side spectacle temple 21, and outward through the horizontal opening of the holding apparatus 20. Now that the writing instrument 23 is clear of the holding apparatus 20, it is free for use (FIG. 2).

In the case of FIG. 9, detachment occurs when the wearer gently pulls the writing instrument 23 away from the magnetic connection holding apparatus 27 along right-side spectacle temple 21. After detaching the writing instrument 23 from the magnetic connection, writing instrument 23 now is free for use (FIG. 8).

In the case of FIG. 11, detachment occurs when the wearer gently pulls the writing instrument 23 away from the right-side spectacle temple 28, and outward through the horizontal opening of the hollow recess holding apparatus 29. Now that the writing instrument 23 is clear of the hollow recess holding apparatus 29, it is free for use (FIG. 13).

After use, the writing instrument 23 is realigned closely for contact up against, or pushed within, the holding apparatus 20, 27 or 29 for secure reattachment.

The wearer therefore has the freedom to use the spectacles without disruption whilst being able to access the attached writing instrument 23 at all times.

I claim:

1. A pair of spectacles comprising:
   a writing instrument;
   a spectacle frame front;
   a first spectacle temple having an end coupled to the spectacle frame front, the first spectacle temple including a holding apparatus fabricated integrally therewith, the holding apparatus includes a hollow recess formed in an outer surface thereof, the writing instrument removably retain therein; and
   a second spectacle temple having an end coupled to the spectacle frame front.

2. A pair of spectacles comprising:
   a writing instrument;
   a spectacle frame front;
   a first spectacle temple having an end coupled to the spectacle frame front, the first spectacle temple including a hollow recess formed in an outer surface thereof, the writing instrument removably received and retained therein; and
   a second spectacle temple having an end coupled to the spectacle frame front.

* * * * *